Sept. 7, 1926.
T. A. NOLAN
SIGN PROJECTION APPARATUS
Filed Nov. 4, 1924     7 Sheets-Sheet 2
1,598,689
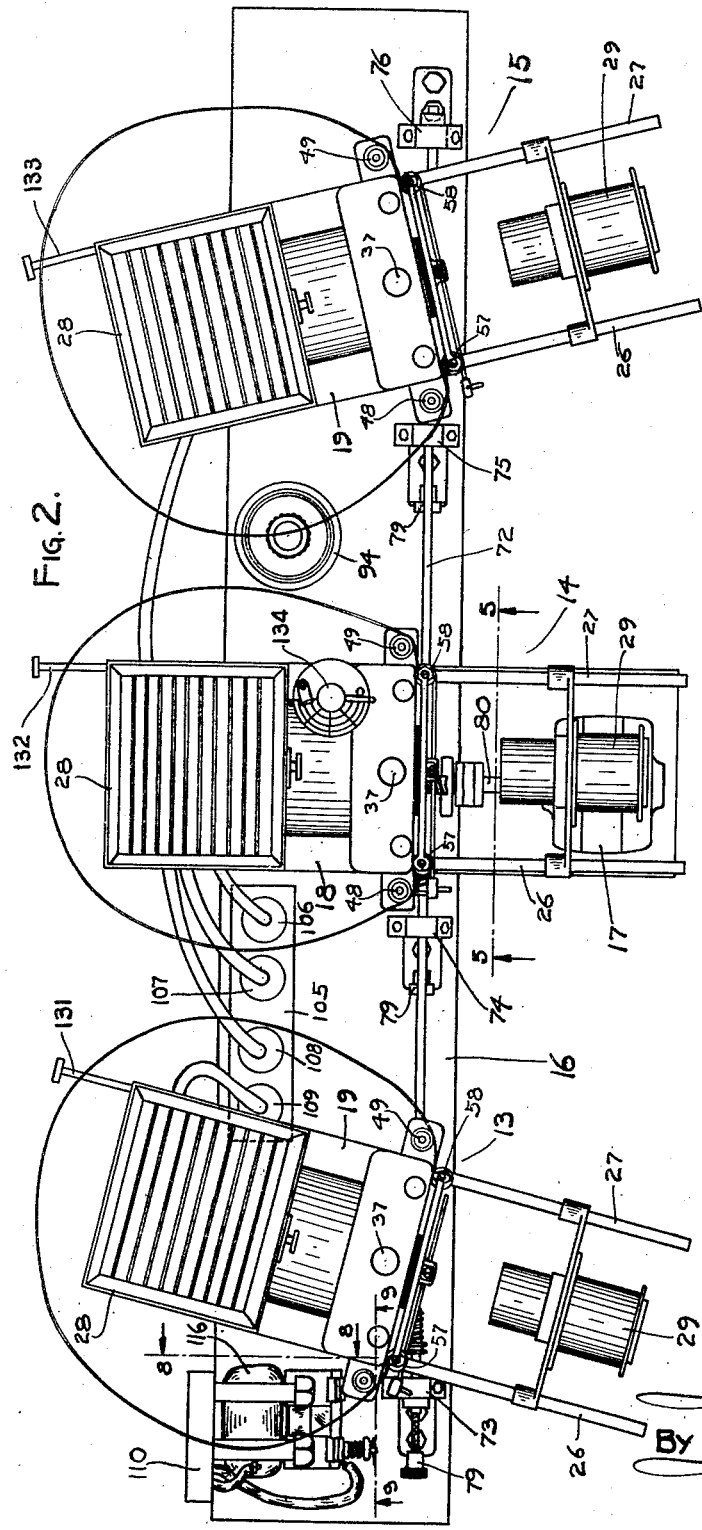
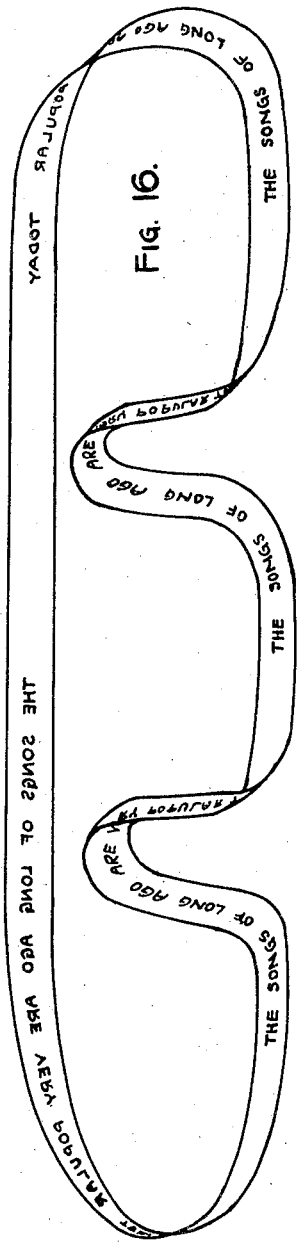

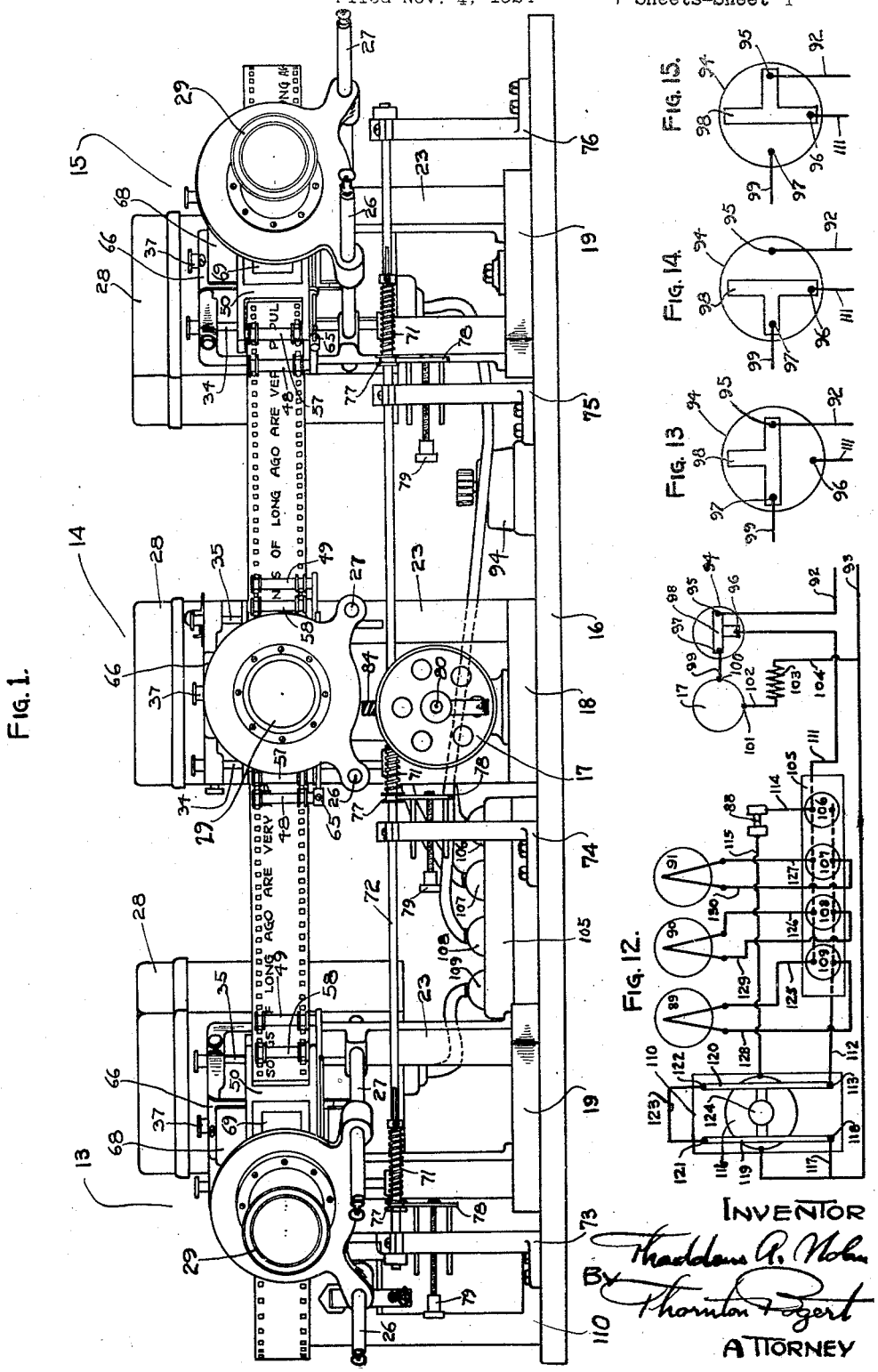

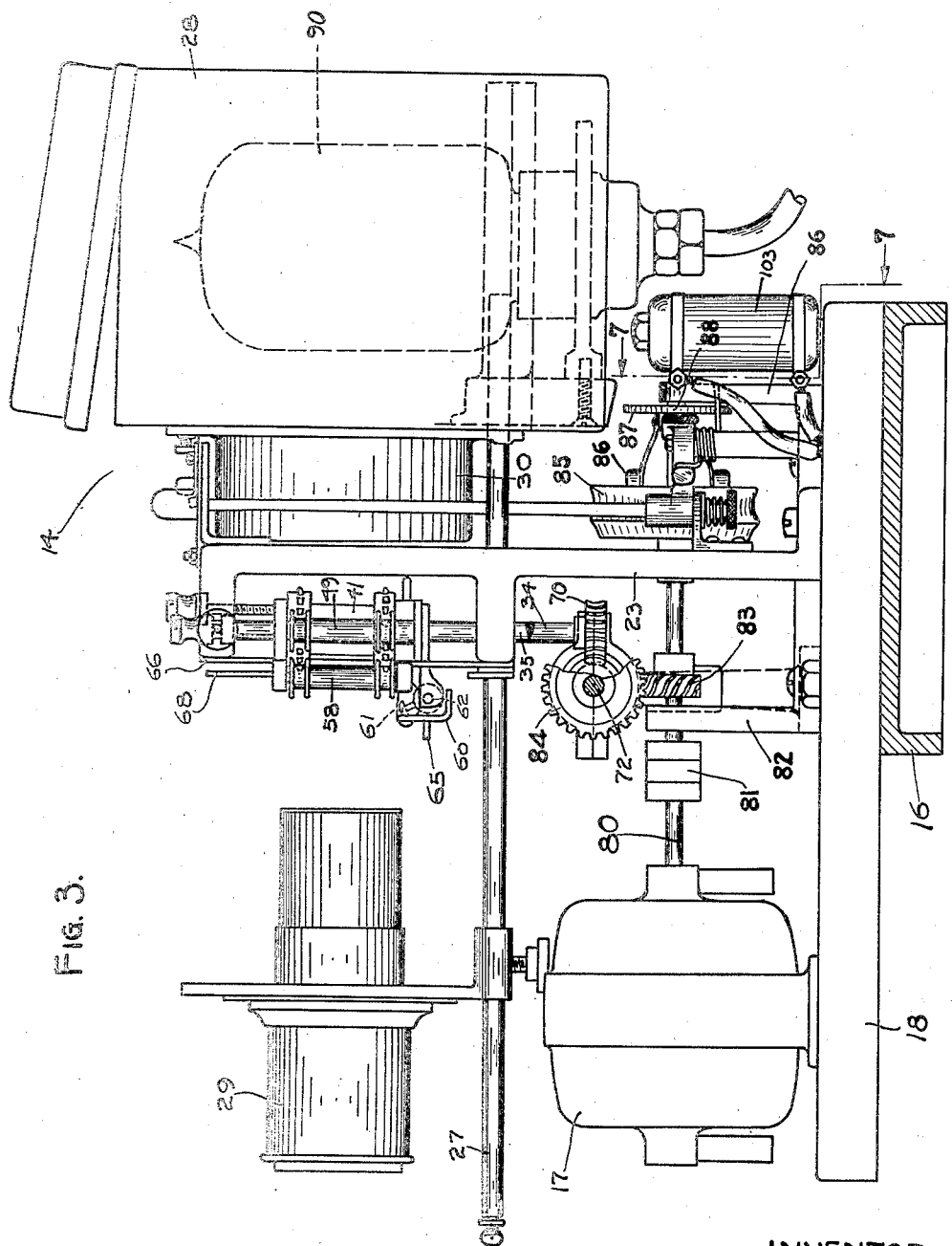

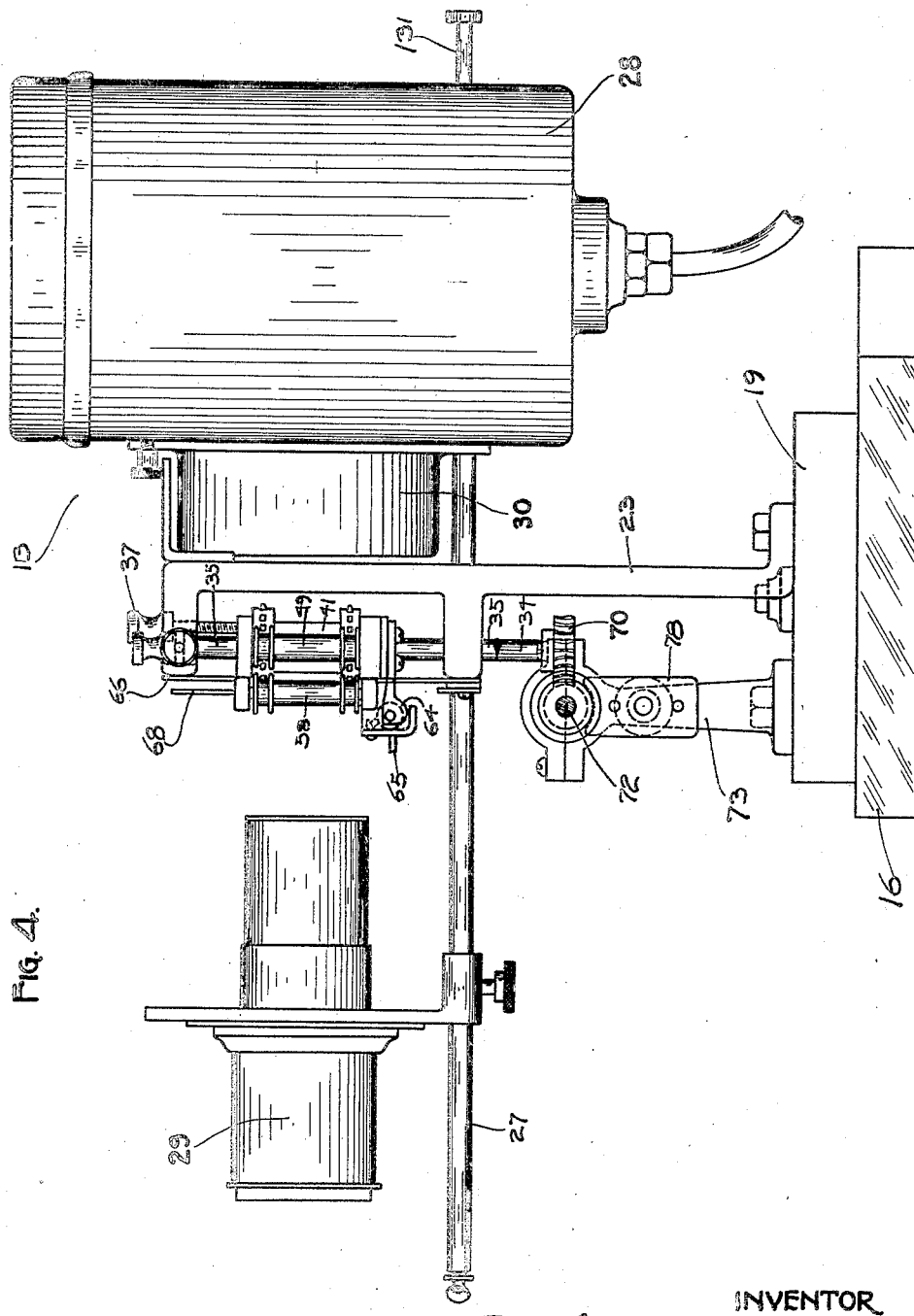

Sept. 7, 1926.
T. A. NOLAN
1,598,689
SIGN PROJECTION APPARATUS
Filed Nov. 4, 1924   7 Sheets-Sheet 5
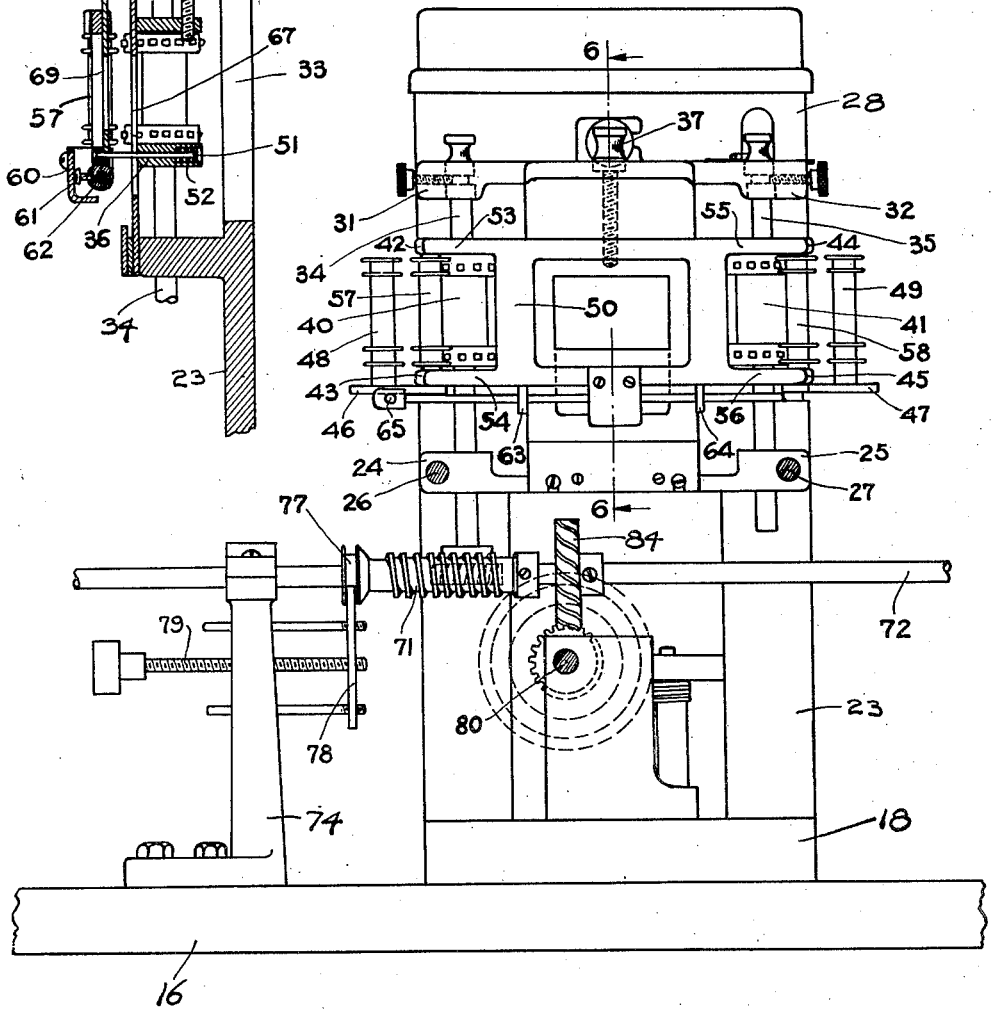

Sept. 7, 1926.  1,598,689
T. A. NOLAN
SIGN PROJECTION APPARATUS
Filed Nov. 4, 1924   7 Sheets-Sheet 6
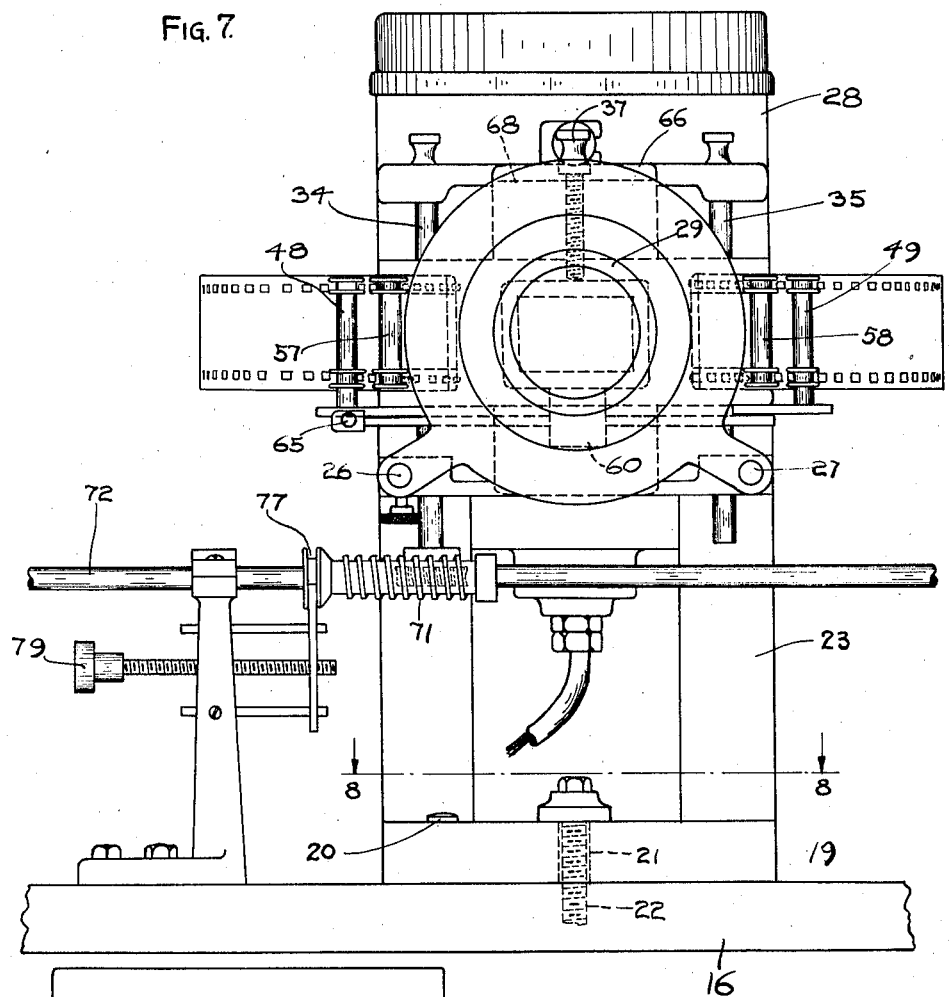
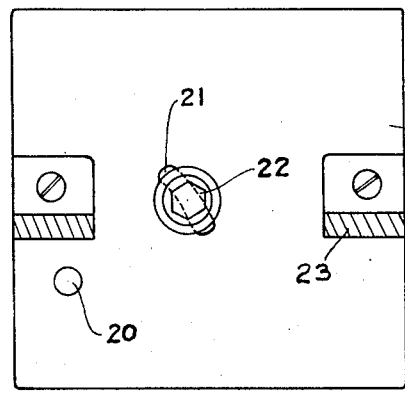
INVENTOR
Thaddeus A. Nolan
BY
Thornton Bogert
ATTORNEY Sept. 7, 1926.
T. A. NOLAN
1,598,689
SIGN PROJECTION APPARATUS
Filed Nov. 4, 1924  7 Sheets-Sheet 7
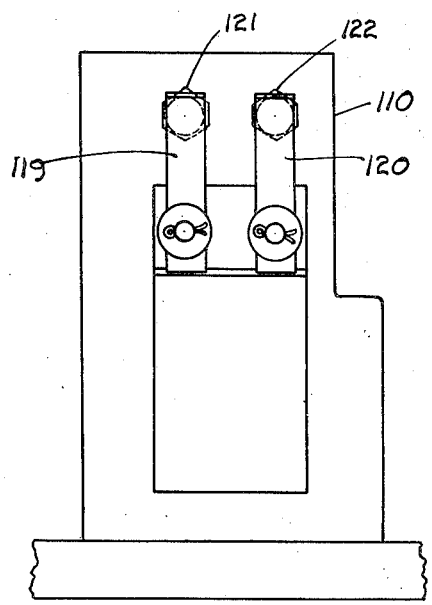
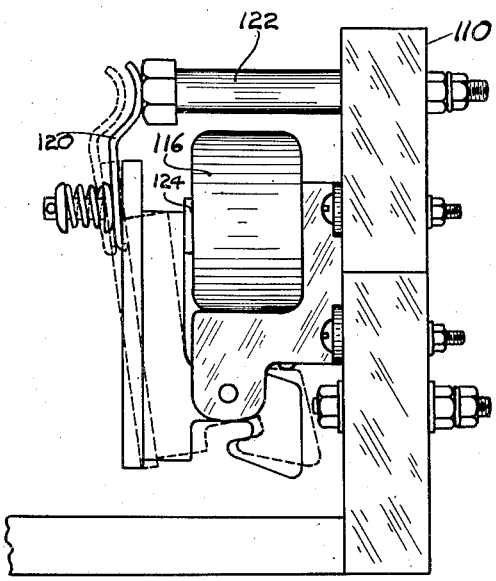
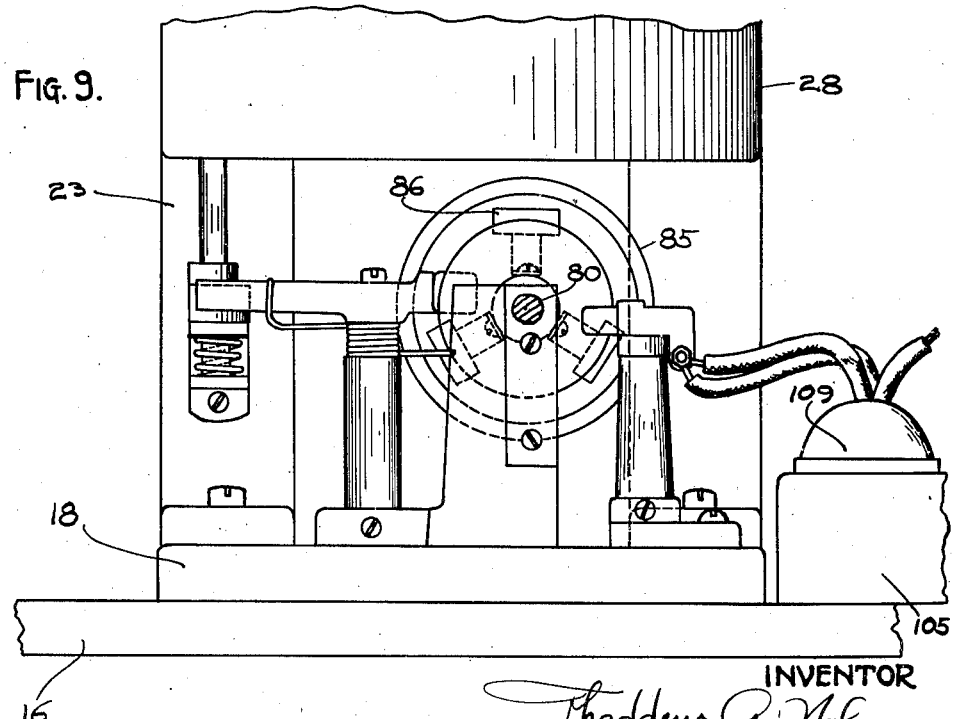

Patented Sept. 7, 1926.

1,598,689

UNITED STATES PATENT OFFICE.

THADDEUS A. NOLAN, OF CINCINNATI, OHIO.

SIGN-PROJECTION APPARATUS.

Application filed November 4, 1924. Serial No. 747,837.

This invention relates particularly to an apparatus designed to carry out the method of projecting sign images which have been set forth in my Letters Patent No. 1,330,604 issued to me upon February 10, 1920 for an illuminated sign.

An object of this invention is particularly to produce sign projection apparatus which operates in accordance with the method of projection disclosed in the patent above mentioned, but which does so by a novel utilization of an adaptation of the type of apparatus disclosed in my copending application serially numbered 439,435 filed January 24, 1921.

A further object of my invention is to produce an apparatus which is designed to produce character images upon a sign sight portion in a manner such that the images projected may be many times the size of the images it is possible to project from the apparatus disclosed in the copending application to which reference has been made, without sacrificing the sharpness of outline or light intensity which it is necessary to employ to illuminate the character images properly in order that they may be clearly legible at relatively great distances.

These and other objects are attained in the apparatus descrbed in the following specification and illustrated in the accompanying drawings in which;

Fig. 1 is a front elevation of the apparatus embodying my invention.

Fig. 2 is a plan view of the apparatus shown in Fig. 1.

Fig. 3 is a side elevation of the central unit or portion of my improved apparatus, from which the driving power of the entire apparatus is secured.

Fig. 4 is a side elevation of one of the end units which receives its driving power from the central unit shown in Fig. 3.

Fig. 5 is a front elevation of the central unit taken on the line 5—5 of Fig. 2.

Fig. 6 is a transverse sectional view of each unit taken on the line 6—6 of Fig. 5.

Fig. 7 is a front elevation of one of the end units of my improved apparatus.

Fig. 8 is a sectional plan view taken on the line 8—8 of Fig. 7.

Fig. 9 is a fragmental rear elevational view of the central section or unit of my improved apparatus.

Fig. 10 is a side elevation of an automatic switch or cut out embodying a detail of my invention.

Fig. 11 is a front elevation of the detail shown in Fig. 10.

Fig. 12 is a circuit diagram of the electrical connections employed in my improved apparatus.

Figs. 13, 14 and 15 are diagrammatic views of a detail of the circuit shown in Fig. 12, showing the parts thereof in different positions.

Fig. 16 is a perspective view of a form of character bearing ribbon which may be used in my apparatus.

The apparatus embodying the objects above set forth embraces three principal units of mechanism, 13, 14 and 15 which are suitably mounted, as will be hereinafter described, on a base 16, with coordinating mechanism adapted to synchronize the unit mechanisms 13, 14 and 15, a source of power, such as the driving motor 17, being employed to operate the entire assembly.

The central unit 14 is positioned upon the base in a relatively fixed position therewith, while the units 13 and 15 which are located at the ends of the base on each side of the central unit 14 are pivoted relatively to the base. Unit 14 has a base 18 which extends forwardly beyond the base 16, as shown in Fig. 3, and carries thereon the motor 17. Each of the units 13 and 15 are identical and for this reason the description of one will aply to the other, the same reference numerals having been placed upon the corresponding parts of each unit. Base 19 of each of the units 13 and 15 is pivoted for adjustability at a point 20, see Figs. 7 and 8, by means of a pin which extends from the base 16. A slot 21 formed concentrically with pivot 20, permits of the adjustability of the base to be fixed by means of a locking screw 22 which is screw threaded into the base 16. Upon each base 19 is mounted the upright frame 23 which carries the mechanism and other vital features of the unit. A similar frame also forms the supporting element of the mechanism of the central unit 14, and is correspondingly numbered.

Incidentally the following described features of mechanism are identical in each of the units 13, 14 and 15 and will therefore be correspondingly numbered. Extending forwardly from each frame 23 are two lugs 24 and 25 through which pass two rods 26 and 27 which extend forwardly and rearwardly. Upon the rearward extension of these rods a lamp house 28 is mounted and upon the forward extension a lens tube 29 is mounted. The lamp house is mounted rigidly while the lens tube may be mounted adjustably for purposes of focussing with relation to the condenser lens within the tubular extension 30 of the lamp house. Upon the frame 23 above the lugs 24 and 25 are formed correspondingly aligned lugs 31 and 32 at the top of the frame. Between the upper and lower pairs of lugs an opening 33 is formed in alignment with the condenser and lens tubes. In front of opening 33 and adapted to operate between the pairs of lugs 24 25 and 31 32, is the mechanism by means of which the separate units 13, 14 and 15 are caused to function.

Each mechanism has two shafts 34 and 35 which are journalled in the lugs 24 31 and 25 32 respectively. Upon these shafts a sliding frame 36 is mounted for movement adjustably. This siliding frame is provided with a means of adjustable movement upwardly and downwardly, consisting of a manually operable screw 37 which is rotatably mounted in the stationary frame 23 between lugs 31 and 32 and which is screw threaded into the adjustable frame, as shown in Fig. 6. Screw 37 is permitted to rotate in the stationary frame, but is held against longitudinal displacement by pin or screw 38 which passes into the frame 23 and engages a groove 39 formed in the screw 37 beneath its head. Splined on shafts 34 and 35 are the respective sprockets 40 and 41 which are moved to adjusted positions with the frame because they are located between the respective pairs of projections 42, 43 and 44 45 with which the sliding frame 36 is provided and by means of which it is mounted for vertical reciprocation upon the shafts 34 and 35. Projections 43 and 45 carry extensions 46 and 47 which support guide rollers 48 and 49 for purposes which will be described shortly. In front of sliding frame 36 is an auxiliary frame 50 which is mounted on rods 51, see Fig. 6, by means of which the frame is rendered movable forwardly and backwardly, the rods being mounted reciprocally in frame 36 and drawn backwardly yieldingly by springs 52 so that the auxiliary frame is held yieldingly toward sliding frame 36. Auxiliary frame 50 is provided with two pairs of projections 53 54 and 55 56 between the projections of each pair of which are located the rollers 57 and 58 respectively. The rollers 57 and 58 are positioned to engage and to roll in contact with sprockets 40 and 41 when frame 50 is in its retarded position. Means have been provided to retain the frame 50 in its drawn forwardly position for purposes which will be explained. This means consists of a forwardly projecting bracket 60 which is secured to frame 50, back of which a lug in the form of a screw 61 from a shaft 62, is located for engagement therewith. The shaft 62 is mounted rotatively in bearings 63 and 64 which extend forwardly from sliding frame 36, one end of the shaft being provided with a handle 65 for effecting its rotation. When the shaft has been rotated to the position shown in Fig. 6, the auxiliary frame has been moved forwardly by screw 61, thus moving rollers 57 and 58 from sprockets 40 and 41. A plate 66 is secured to the top of stationary frame 23 as shown, and is provided with an opening 67 centrally located between shafts 34 and 35. Back of auxiliary frame 50 and secured thereto is a plate 68 which is provided with an aperture 69 located in register with opening 67 of plate 66. In each unit, whether it be the central one or one of the end ones, shaft 34 is extended downwardly and is provided at its lower end with a worm gear 70. These worm gears are in alignment with each other so that they mesh with worms 71 which are splined upon a shaft 72 which extends from end to end of base 16 and in front of the operating mechanism thus far described. Shaft 72 is journalled in bearings 73, 74, 75 and 76 which are mounted on the base. Each worm is provided with a grooved collar 77 at its end, which is engaged by a finger 78 mounted on the end of an adjustment screw 79 which is adjustable within one of the bearings 73 to 76 inclusive. By means of screw 79 its attached worm 77 may be adjusted longitudinally of the shaft, thus creating a slight adjusting rotary motion to shaft 34, the purpose of which will be hereinafter explained.

Thus, the description which has been given relates to each of the units 13, 14 and 15 of the mechanism of this device. However, it is necessary to drive the mechanism from the motor 17, and for this purpose I have provided a shaft 80 which extends transversely of the base 16 and its shaft 72, being located beneath shaft 72. Shaft 80 is connected with the motor shaft by a suitable coupling 81 and is journalled in bearings 82 and 86 extending from the base. Upon shaft 80 is a spiral gear 83 which meshes with a cooperating spiral gear 84 on shaft 72. Thus power is transmitted to the operating mechanisms of the several units.

There now remains a controlling mechanism and circuit to be described, by which the several units which have thus been coordinated by the shaft 72 and its worms 71, are driven. Upon shaft 80 is a disc 85 which carries a series of governor weights 86 having operative connection with a movable disc 87 which in turn cooperates with a contact 88 to form a switch which controls a circuit in which the motor 17 and lamps 89, 90 and 91, see Fig. 12, are located.

The circuit, which I have shown diagrammatically in Fig. 12, has the several elements thereof designated by numerals which are, as nearly as is practical, duplicated in the several views shown in the drawings. Two leads 92 and 93 supply current from the source of supply. Located on the base 16 is a manual switch 94 which has three terminals 95, 96 and 97 with which a three point switch bar 98 cooperates as shown in Figs 12, 13, 14 and 15. A connection 99 is made from terminal 97 of the switch 94 to one terminal 100 of the motor 17. The other terminal 101 is connected by means of a lead 102 to a resistance coil 103 which is provided with a connection 104 to service lead 93. Thus when switch bar 98 is in either of the positions shown in Figs. 12 or 13, the motor will be operated. A plug contact block 105 affords the means by which the remaining elements of the circuit are brought into the proper relationship. This block contains a series of plugs 106, 107, 108 and 109 by means of which the lamp bulbs 89, 90 and 91 are brought into the circuit together with the governor switch 88 and circuit breaker 110 which is mounted directly on the base together with the contact block 105 and manually operated switch 94. Two leads 111 and 112 run straight through block 105, the former connecting directly with switch terminal 96 and the latter with terminal 113 of the circuit breaker. Plug 106 is provided with a connection 114 by means of which governor switch 88 is connected in turn through a lead 115 to one terminal of the coil 116 of the circuit breaker. The other terminal of the magnet 116 is connected directly to lead 93 from the source of surrent supply. A connection 117 is made with terminal 118 of the circuit breaker. The breaker bars 119 and 120 of the circuit breaker extend from the respective terminals 118 and 113 of the circuit breaker to the terminals 121 and 122 of the circuit breaker. The movement of the breaker bars toward and the holding of them into contact with the terminals 121 and 122 is effected by the magnet 116 acting upon the armature 124 attached to the bars 119 and 120. Connection 123 unites the terminals 121 and 122 of the circuit breaker. It is through this circuit breaker that the lamps 89, 90 and 91 are controlled. The terminals 125 and 126 and 127 of these lamps are connected through their plugs 107, 108 and 109 to the lead 111, which through the switch 94 establishes connection with service lead 92. Terminals 128, 129 and 130 of the lamps are connected directly with lead 112 in the same manner. Thus the lamps are placed directly under the control of the circuit breaker.

In order that the apparatus may be placed in condition for operation it is necessary to move handle 65 to the forward position shown in Figs. 4 and 5. In this condition the shaft 62 has been rotated to bring screw 61 against the bracket 60, as shown in Fig. 6. This moves frame 50 with its frame 68 away from plate 66. With this movement the rollers 57 and 58 are moved away from sprockets 40 and 41. This opens a space, as shown in Fig. 6, in which one or a series of ribbons or films are placed, as shown in Figs. 1 and 2 respectively. This ribbon may be of the usual form taken by motion picture films in which the edges are perforated as shown, for engagement with the teeth of sprockets 40 and 41. The apparatus is so arranged that the ribbon may be either a single one as shown in Fig. 1, or a series of ribbons as shown in Fig. 2. In the event the single ribbon is used the legend caried by the ribbon will occur in each separate line placed thereon. The position of each of these lines relatively to the other may be staggered or stepped in the same manner as has been shown in my Patent Number 1,330,604 referred to above, so that although the legend may be presented from each of the image projecting units simultaneously, the unit 13 will take care of the first letter or group of letters of the legend, the unit 14 will take care of the next letter or group of letters and the third unit 15 will take care of the third letter or group of letters. As the example has been shown in the patent to which I have referred, the word "The" is projected from the three units jointly, the unit 13 projecting the letter "T", the unit 14 projecting the letter "H" and the unit 15 projecting the letter "E." If, as in the example referred to, the legend starts out with—"The songs of long ago", the further movement of the ribbon will present the letter H to the unit 13 and the letter E to the unit 14 while the space in the form of a blank will be presented to the unit 15, but the presentation of the same letter, as for example the letter E will be from a separate line of letters, viz, that line which has been provided for its particular projecting unit.

If a separate ribbon is employed for each projecting unit, as shown in Fig. 2, the ribbons will be duplicates of each other. The placing of these ribbons in their units will, however, govern the manner in which the legend image is presented. Taking the above example of a legend, the ribbon of unit 13 will be placed so that the image of the letter "T" is projected therefrom. The ribbon of unit 14 will be placed so that the image of the letter "H" will be projected therefrom. The ribbon of unit 15 will be placed so that the image of the letter "E" will be projected therefrom. Upon starting the apparatus it will be found that the projection of the legend images will be as in the case of the single ribbon. However, in as much as the separate ribbon for each unit causes elimination of additional lines of duplicate subject matter, the amount of space available on each ribbon will be utilized by making the letters much larger than is otherwise possible in order to project images of very large size, or the extra space may be employed for embellishments if desired. At the rear of the units I have provided supports 131, 132 and 133 for use as supports of the ribbon or ribbons as they pass to the rear of the lamp houses of the apparatus. An obvious deviation which embodies the same principle as that employed in using separate ribbons for each unit, is to provide but one ribbon for passage through the units, which, instead of passing directly from unit to unit, is provided with loops L' and L², as shown in Fig. 16, which pass rearwardly between the units. This affords a ribbon of sufficient length with the legend thereon occurring frequently enough and in properly spaced relation so that it is but necessary to provide one line of letters instead of several as in the form of ribbon shown in Fig. 1.

With the ribbon or ribbons thus in position the handle 65 is moved downwardly, thus allowing the plate 68 to approach plate 66 until rollers 57 and 58 have pressed the ribbon against the sprockets 40 and 41 with the sprocket teeth extending through the holes in the ribbon. The ribbon or ribbons having thus been secured in position the manually operated switch 94 may be turned on, as shown in Fig. 12, to start the apparatus. The effect of this is to cause motor 17 to rotate shaft 72 and to thus bring the three units into operation. The current will pass through lines 111, 114, automatic switch 88, line 115, magnet 116 and line 93. This causes magnet 116 to draw the breaker bars 119 and 120 into contact with contacts 121 and 122, thus establishing the current by means of which the three lamps in the lamp houses will be illuminated. The ribbons at this time will be passing through the projection apparatus of the several units and will produce the passage of the legend character images upon the sight portion of the sign in sequence and in a materially enlarged condition from that capable of production from the apparatus and arrangement disclosed in my copending application.

Should the position of one letter image be too close to that of the next character image as it appears in its passage over the sight portion of the sign, or should the space between adjacent character images be too great, the correction may be made by adjusting the longitudinal position of the worm 71 through the agency of its adjustment screw 79, or by changing the angular position of the entire unit about its pivot 20 after the locking screw 22 has been loosened to allow of such movement in the slot 21. Perhaps it may even be desirable to resort to adjustment as to both the worm and unit position.

After the apparatus has been adjusted as described, the continuation of operation is assured. However, should anything occur to reduce the speed of the motor to a point where it would cause the ribbon to travel at a speed which might result in combustion as it passes in front of the beam of light from the lamp house condenser, the governor 87 would cause switch 88 to break the circuit and to thereby permit magnet 116 to become deenergized. This would result in breaker bars 119 and 120 breaking the circuit through lamps 89, 90 and 91 and thus extinguish them. As soon as the motor speed would increase to normal speed the switch would again close and relight the lamps. A controller 137 has been provided for limiting the maximum speed of operation by operating frictionally on the governor, such a control having been specifically set forth in the copending application to which reference has been made. It may be pointed out here that the character of the material of which the films or ribbons may be made can be such as paper or the usual motion picture film composition. In the event that the film is of opaque characteristics the legend characters may be punched out, or if it is of translucent or transparent characteristics the characters may be opaque.

Having thus described my invention what I claim is:

1. A sign projection apparatus consisting of a series of image projection units having adjustability as to position relatively to each other, a character bearing element having a line of characters forming a legend adapted to be passed through each unit, the line of characters being so positioned with relation to the units that successive characters in a legend to be projected appear in successive units simultaneously and pass from unit to unit successively during their operation, and means adapted to drive the mechanism of said units jointly, said means having cordinating devices adapted to adjust the mechanisms of the units to create proper placing of consecutive character images upon a surface adapted to receive them.

2. In a sign projection apparatus the combination of a character bearing element, and a mechanism for moving the character bearing element, said element having a series of duplicate lines of characters thereon arranged in stepped relation to one another, said mechanism consisting of a series of image projecting units of substantially duplicate construction, and means adapted adjustably to synchronize and to operate them jointly to project character images from the element, each line of characters having its particular unit for image projection therefrom, said means consisting of a shaft extending from unit to unit, gears operatively connecting the shaft and each of the units, and a device adapted to adjust the position of certain of the gears to bring images projected by the units into proper registration and alignment.

3. In combination in a sign projection apparatus, a character bearing element, and a mechanism for moving the character bearing element, said element having a series of duplicate lines of characters thereon in stepped relation to one another, said mechanism consisting of a series of image projecting units adapted to operate in conjunction with the element, and a unit synchronizing device, each of said units consisting of a main frame having substantially horizontal rotary adjustment, a frame vertically adjustable on the main frame, and element propelling means on the vertically adjustable frame adapted to propel the element longitudinally, continuously and uniformly, said unit synchronizing device consisting of a drive shaft extending from unit to unit, and gears operatively connecting the shaft and respective units, certain of said gears having independent adjustability relatively to the shaft and each other, whereby the operative relation of the units may be varied relatively to each other.

4. In combination in a sign projection apparatus, a series of image projecting units having adjustability as to position relatively to each other, a character bearing element having a line of characters adapted to be passed through each unit, the line of characters being so positioned with relation to the units that successive characters in a legend to be projected appear in successive units simultaneously and pass from unit to unit successively during their operation, and means adapted to drive the mechanism of said units jointly, said means consisting of a drive shaft and coordinating devices adapted to adjust the mechanisms of the units to bring about proper placing of consecutive character images upon a surface adapted to receive them, said coordinating devices consisting of a gear on each unit mechanism adjacent to the shaft, a worm in mesh with each gear and splined on the shaft, and manually operable means adapted to adjust the longitudinal position of the worms independently on the shaft.

In testimony whereof I have hereunto affixed my signature.

THADDEUS A. NOLAN.